US008752193B2

(12) United States Patent
Rasizade et al.

(10) Patent No.: US 8,752,193 B2
(45) Date of Patent: Jun. 10, 2014

(54) CONTENT BINDING AT FIRST ACCESS

(75) Inventors: Oktay Rasizade, Castro Valley, CA (US); Haluk Kent Tanik, Mountain View, CA (US); Fabrice Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 642 days.

(21) Appl. No.: 12/619,112

(22) Filed: Nov. 16, 2009

(65) Prior Publication Data

US 2011/0119767 A1 May 19, 2011

(51) Int. Cl.
*H04L 29/06* (2006.01)
(52) U.S. Cl.
USPC ............ 726/27; 726/26; 726/31; 726/33; 705/51; 705/57; 705/59; 711/163; 711/164
(58) Field of Classification Search
USPC ............ 726/26, 27, 31, 33; 705/51, 57, 59; 711/163, 164
See application file for complete search history.

(56) References Cited

U.S. PATENT DOCUMENTS

| | | | | |
|---|---|---|---|---|
| 5,765,152 | A * | 6/1998 | Erickson | 1/1 |
| 6,216,263 | B1 * | 4/2001 | Elam | 725/28 |
| 7,133,845 | B1 * | 11/2006 | Ginter et al. | 705/51 |
| 7,185,192 | B1 * | 2/2007 | Kahn | 713/155 |
| 7,735,728 | B2 * | 6/2010 | Wallerstorfer | 235/382 |
| 8,572,591 | B2 * | 10/2013 | Cwalina et al. | 717/147 |
| 2003/0027121 | A1 * | 2/2003 | Grudnitski et al. | 434/308 |
| 2004/0128250 | A1 * | 7/2004 | Fox et al. | 705/52 |
| 2007/0209077 | A1 * | 9/2007 | Kitani | 726/26 |
| 2008/0004886 | A1 * | 1/2008 | Hames et al. | 705/1 |
| 2008/0027659 | A1 * | 1/2008 | Miyasaka et al. | 702/39 |
| 2008/0034440 | A1 | 2/2008 | Holtzman et al. | |
| 2008/0086693 | A1 | 4/2008 | Jogand-Coulomb et al. | |
| 2008/0114686 | A1 * | 5/2008 | Jogand-Coulomb et al. | 705/51 |
| 2008/0115211 | A1 * | 5/2008 | Jogand-Coulomb et al. | 726/21 |
| 2008/0256354 | A1 * | 10/2008 | Blumenau | 713/153 |

(Continued)

FOREIGN PATENT DOCUMENTS

EP    1 445 888 A1    8/2004

OTHER PUBLICATIONS

International Preliminary Report on Patentability issued in international application No. PCT/US2010/055919, issued May 22, 2012 (7 pages).
International Search Report issued in international application No. PCT/US2010/055919, mailed Feb. 2, 2011 (4 pages).

(Continued)

*Primary Examiner* — Cordelia Zecher
*Assistant Examiner* — Sarah Su
(74) *Attorney, Agent, or Firm* — Brinks Gilson & Lione

(57) ABSTRACT

A method and system of binding content at first access is disclosed. A non-volatile storage device may provide a content access script and a content binding script in order to access protected content. An accessing application may attempt to access the protected content by executing a content access script. The accessing application must have permission to access and execute the content access script. If the accessing application cannot access or execute the content access script, the accessing application may access and execute the content binding script. The content binding script contains instructions that enable the accessing application to successfully execute the content access script. The content binding script, when executed, may disable itself from being executed again by moving critical information associated with the access to protected data. Thus, the content binding script may be executed once to enable an accessing application to successfully execute the content access script.

36 Claims, 12 Drawing Sheets

(56) References Cited

U.S. PATENT DOCUMENTS

| | | |
|---|---|---|
| 2009/0132603 A1 | 5/2009 | Takeno |
| 2009/0172809 A1* | 7/2009 | Yuan et al. .................. 726/19 |
| 2009/0282257 A1* | 11/2009 | Senshu ...................... 713/182 |
| 2010/0030982 A1* | 2/2010 | Sela et al. ................... 711/162 |

OTHER PUBLICATIONS

Written Opinion of the International Searching Authority issued in international application No. PCT/US2010/055919, mailed Feb. 2, 2011 (6 pages).

* cited by examiner

CONTENT BINDING AT FIRST ACCESS

TECHNICAL FIELD

This application relates generally to the distribution and portability of content on a physical media while enforcing licensing terms such as "per seat" license, "per user" license, "per subscriber" and more.

BACKGROUND

Content and application providers often prefer to sell and distribute content on a physical media. They are also interested in a model where such content could be downloaded, stored on a physical media, and consumed on another device which may not have a communication connection to the content or application provider.

Software applications (or simply "applications") are usually sold with specific licensing terms such as "per seat" (pay for the number of devices where the physical copy can be installed), "per user" (pay for a number of user that can simultaneously use the application), "per subscriber" (pay for the number of subscriber that can access that physical copy), etc. These licensing terms may also apply to multimedia content such as music, video, wallpaper, games and others.

However such licensing terms are either based on trust and/or require a connection to a server. For example, a typical "per seat" license uses a license key but there is no control on how many times the license key is used. And before using an application or content on a second device there is usually no control over removal of such software application and content from the first device. This is typically based on trust. Some other systems may rely on Digital Rights Management ("DRM") technologies instead of trust. But this usually means the license is acquired from a server in the first place. The license could then be transferred to some other devices where the physical copy would be consumed.

Trust-based licensing is typically not used for distributing multimedia content. Multimedia distribution models usually provide unlimited access with copy-protection or a DRM-based system that requires a communication connection with a content or application provider in the first place. This is mostly due to the fact that optical ROM-disks which are commonly used for such distribution cannot easily enable these other models. Moreover, connection to a server is not always available or could generate additional cost. Therefore, there is a need for a device that permits the distribution of content with more advanced licensing models.

SUMMARY

Distributing content and applications on a physical media that can be updated advantageously enables various licensing models and does not require a prior connection to a server. The present application discloses embodiments of methods and systems for enforcing licensing terms for content and application distributed with (or downloaded to) a physical media to use with an accessing application running on a external device. Furthermore, when not combined with DRM, embodiments of the system and method permit unlimited use and installation on accessing devices matching the configuration of the accessing device, according to the licensing terms, where the binding was set.

In some embodiments, the licensing can be enforced after some binding information has been updated at the time of first access taking in account the licensing terms and the configuration of the accessing application, where the accessing application may be executed by a processor on an accessing device. In some other embodiments, the licensing can be enforced after the access control has been updated to authorized access devices matching the accessing application configuration according to the licensing terms. In some other embodiments the licensing is enforced by using an accounting mechanism and the accounting is updated to authorize access to devices matching the accessing application configuration according to the licensing terms. Some embodiments show how the use of accounting can also permit modifying, resetting or adding additional licenses. In particular, some embodiments show how a connection to a server can permit resetting or adding additional licenses for the physical copy and how the updated copy can then be used on a new configuration with no need for a connection to a server anymore.

Some embodiments show how to bind an entire set of content at once therefore avoiding mix and match licensing on a physical media.

Other embodiments and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Content and application providers tend to prefer the model where the license comes with the physical copy because it does not require a connection to a server and does not require a DRM system. They like this model whether the content is distributed or has been downloaded to the physical device. However enforcing licensing terms other than simple copy-protection for this type of distribution is complicated because the content has to be protected and the first accessing device configuration is typically unknown when the copy is prepared.

Typical licensing terms could be: per seat, per subscriber, per International Mobile Subscriber Identity (IMSI) value, per user, per Subscriber Identity Module (SIM), per network, per subscription to a service, etc. These terms may also combine with some expiration, where at some point in time the licensed content or application (collectively referred to as content) cannot be accessed anymore.

Methods and systems for binding the content or application at first use are explained in the exemplary embodiments below. In one embodiment, when installed or accessed, the content or application is bound to the device (seat), user, or subscriber in accordance with the license terms, and successful execution of the application or access to the content may be limited to the seats, users, or subscribers bound to the content or application. For example, "per seat" licensing could be achieved by device binding and verifying information from to the accessing device such as a device identification value before allowing access; "per SIM" licensing could be achieved by binding to the SIM card and verifying the availability of the SIM to the accessing application before allowing access; "per network operator" licensing could be enabled with binding to a network operator ID and verifying information about the network such as network ID from the SIM card before allowing access.

Figure 1:
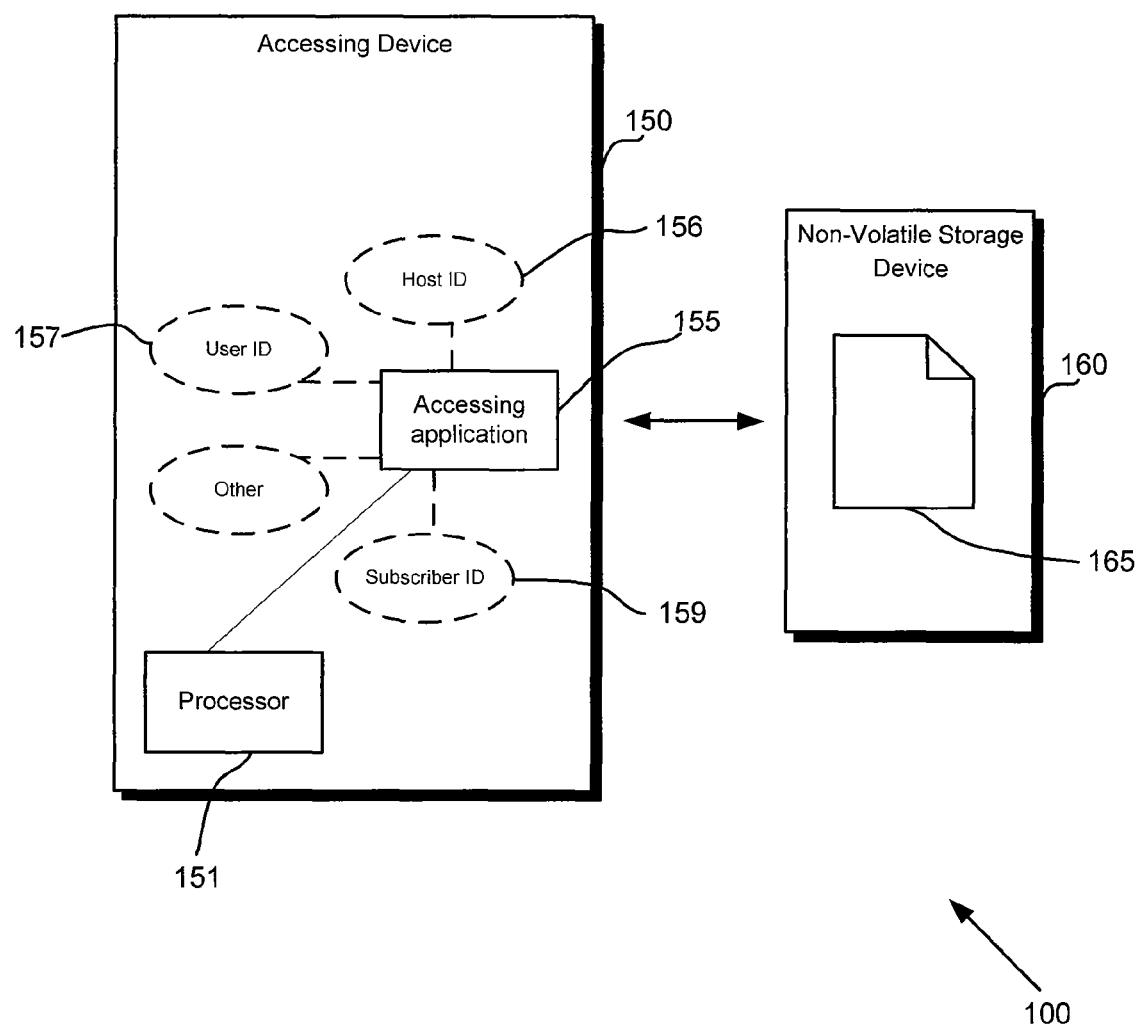
FIG. 1 is a diagram illustrating an exemplary system for controlling access to content on a non-volatile storage device.

FIG. 1 is a diagram illustrating an exemplary system 100 where an accessing device 150 is removably coupled with a non-volatile storage device 160. The non-volatile storage device 160 may be loaded with content 165. In one embodiment, the content is a typical physical copy. In the exemplary system 100, an accessing device 150 may write, read, erase, modify, or otherwise access content stored in a non-volatile storage device 160. In one embodiment, the non-volatile storage device 160 is pre-loaded with a physical copy of the content 165. In one embodiment, the content 165 comprises an application.

The non-volatile storage device 160 may be one of a variety of device types like memory cards (e.g. Secure Digital (SD) cards), writable optical disk (e.g. CR-R or CD-RW) or other portable devices (e.g. cell phones).

A variety of accessing devices 150 having a processor 151 could execute the accessing application 155, such personal computers, notebook computers, personal digital assistants (PDAs), various data communication devices, digital cameras, cellular telephones, portable audio players, automobile sound systems, and similar types of equipment.

The accessing application 155 could be a multimedia player application, an application installer, a middleware application such as DRM, a software library, or other software variations that can use or access the content.

The accessing application 155 could optionally leverage information about the accessing device that is relevant to the licensing terms of the piece of content being accessed. Such information may be referred to as a configuration of the device where the accessing application 155 is running. Examples of such information include a subscriber ID 159 such as provided by a SIM card, a host ID 156 such as the IMEI on a mobile handset, a user ID 157, etc. (note that this list and the figure are provided as an illustration and are not intended to limit the various embodiments in any way). For example, a "per seat" licensing could bind to host ID 156; a licensing for a specific service subscriber could bind to subscriber ID 159; a licensing for a specific service could bind to a service ID and status, etc. A configuration may include the identity of the user of the accessing device, the identity of a domain or network in communication with the accessing device, an association of the accessing device with a corporate identification, such as a network address associated with hardware installed at a company location, or any other hardware or software instructions, inputs, or settings that identify, configure, or set up an accessing device 150 for a particular mode of operation. In one embodiment, when the accessing device is a cellular telephone, information from a Subscriber Identity Module card, such as a subscriber International Mobile Subscriber Identity (IMSI) value or a Mobile Subscriber Integrated Services Digital Network (MSISDN) value, may be an aspect of the configuration, as these values may configure the accessing device for operation on a cellular telephone network.

At first it is important to note that the content 165 or application has to be protected so that use or access is controlled. This is the keystone of any system that is not solely based on trust. Different methods exist to control access to content 165. Any one of a number of access control methods (e.g. requiring authentication of the accessing entity, controlling access to a cipher key required to decrypt data stored in an encrypted format, requiring a DRM Rights Object to access the content, etc.) may be used with the embodiments described herein. The steps required to access content or applications in accordance with the access control method may be organized into an access script. The access script may then be used by authorized applications that access the content. In one embodiment, a script contains instructions or pointers to instructions, such as instructions executable by the accessing device 150. In this embodiment, the content 165 or application is assessed in accordance with the access control method by performing specific steps referenced to or embedded in the script. This content access script or first script is the primary means of access and when such script does not execute successfully then the accessing application 155 on the accessing device 150 is not authorized. However a connection to a server might not be needed if a second script that performs the binding can execute successfully.

Figure 2:
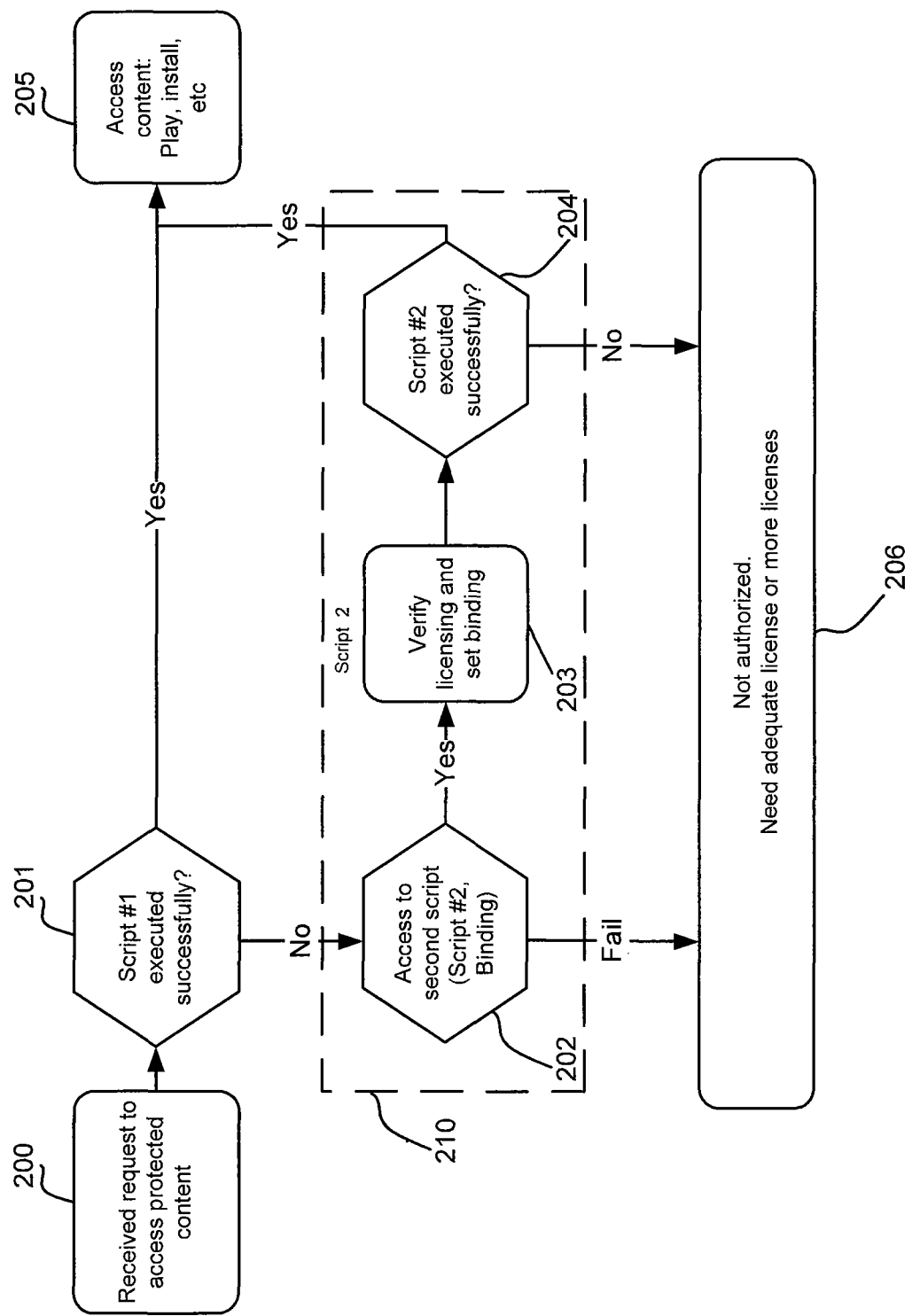
FIG. 2 is a diagram illustrating exemplary steps for binding content.

FIG. 2 is a diagram illustrating exemplary steps for accessing content using a first script and a second script. A request to access protected content 165 is received at step 200. At step 201, the accessing application tries to access the content according to the first script, also referred to as a content access script. If the licensing terms are met for the accessing application and the accessing device information then content can be accessed at 205. The access could be, for example, playback, use or install. If the licensing terms are not met then control passes to step 202 and the accessing application attempts to execute the second script, also referred to as a content binding script, as shown in the collection of steps 210. In some embodiments, the second script might have disabled itself once the licensing terms have been met (such as when the second script already has been executed at least one time) and in that case step 202 will fail, and control then passes to step 206. Step 206 may include further steps that could provide further access to the content 165, such as obtaining an adequate license or additional licenses to allow the second script to execute successfully in the future. If the second script can execute then typically at step 203, if the licensing terms could be met, the binding would be set according to the licensing terms and to the configuration from the accessing device. For example if the licensing terms are "per SIM" then the licensing terms are met when a valid SIM is present in an accessing device 150. In some embodiments, the second script can affect a single content file. In other embodiments, the second script can affect an entire set of files at once. If the second script has executed successfully at step 204 then content 165 can be accessed at step 205. If the second script has not been successfully executed then further steps might provide further access to the content at step 206, such as obtaining an adequate license or additional licenses.

In one embodiment, the second script that performs the binding when executed successfully can also access the content and includes step 205. In another embodiment, the second script only authorizes the first script to execute successfully and step 204 passes control back to step 201 instead of 205 when the second script executes successfully. In some embodiments, where the second script includes step 205 and where the script disables itself from further successful execution, it is possible to implement use-one and install-once licensing terms. In other embodiments, the content may be accessed as long as the licensing terms are met (and, if DRM is being used, the DRM rights have not expired). In some embodiments, the second script can affect an entire set of files at once.

In some embodiments, a script is not necessarily a script per se. It could be as short as a tag in the file or a specific file extension or other identifier of the steps to perform to access such content 165. The second script is not necessarily a script either and, in some embodiments, could be as short as an identifier of how to proceed to tentatively enable access to the content 165 according to the licensing terms attached to the physical copy. In some embodiments, the same information could be used for both scripts but used differently in step 201 and steps 210.

The second script is critical to the licensing and might be protected against unauthorized modification. In order to prevent modification such as swapping scripts, the second script should be associated with the related piece of content 165 and its licensing terms.

Figure 3:
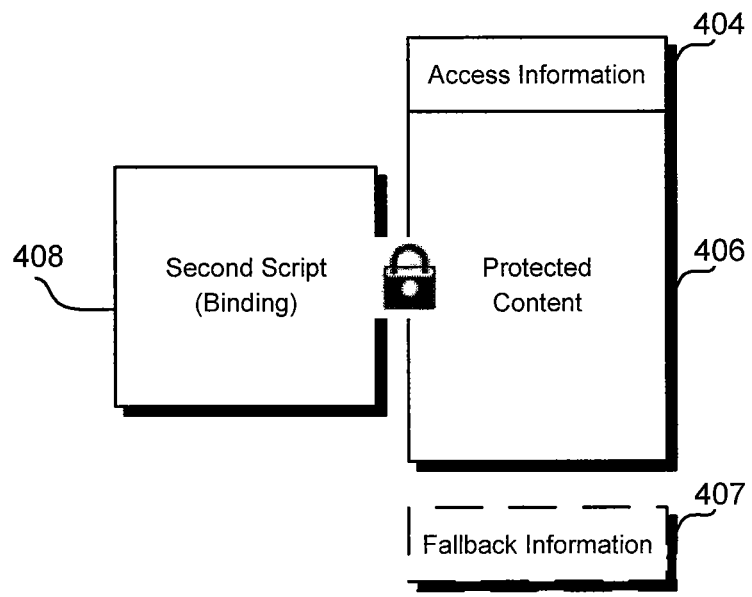
FIG. 3 shows an exemplary conceptual format of the content file.

In some embodiments, the second script could be separated from the content 165 and in other embodiments it could be part of the content file 165. FIG. 3 shows an exemplary conceptual format of the content file 165. As illustrated in FIG. 3, the association should be made secure in order to prevent unauthorized changes. For example, the second script 408 could rely on cryptography to detect and prevent unauthorized changes therefore keeping unchanged the association with the content and the licensing terms. The cryptographic method could rely on some input unique to the content 406 and required for the first script to gain access. Changing that information would prevent the first script from executing successfully, therefore preventing access to the content.

In some embodiments, the access information 404 may include the first script. In other embodiments, the access information 404 may contain information usable for both the first script and the second script and in some cases such information or instructions might be enough so that a separate second script 408 is not needed. For example, such information could mean the licensing terms and the licensing terms could mean for the first script a method to access protected content and the licensing terms could mean for the second script a method to bind the content or a set of content. In that case modifying the access method 404 would cause access to the content using the first script to fail, and would also cause the execution of the second script to fail.

Hereafter are different exemplary embodiments that show how the second script, when executed successfully, could perform the binding at first use, and as a result, may set access to the content 165 using the accessing application 155 in accordance with the licensing terms. It is important to note that the systems and methods for binding and access control can apply to the content itself or to the information required to access the content, such as a DRM rights object. For example, indirect content access control can be achieved by controlling access to a DRM rights object associated with the content.

In some embodiments, the second script could set, modify, add, or create information related to the licensing terms and the accessing device 150 or application 155. That information is needed for the first script to execute successfully. In some embodiments, such information may apply to an entire set of files, thus binding the entire set at once.

The information could be related to the licensing terms and may relate to the configuration of the accessing device 150 where the accessing application 155 runs. For example, the information for a "per seat" license may relate to a host ID 156. In another example, the information for a "per SIM" license may relate to the SIM card present on the accessing device 150, such as the subscriber identification information 159 present in the SIM card. It is important to note that if the information is created in an area available to the end user, it is easy to backup and restore the information in order to recover to a previous state and circumvent content binding in accordance with the license terms. Therefore in some embodiments, such information may be stored in an area that cannot be modified by the end user. For example, the information could be stored in an area that is read-only to the end user. It could be stored as well in an area that is hidden to the end user.

Alternative implementations could add various access control methods to limit the ability of the end user to modify the information. For example, the second script can provide access to the content rights. In another example, the second script could set the accessing application credentials as authorized to access the content 165. In yet another example, the second script could modify the content 165 so that the first script can be executed successfully by the accessing application and device and according to licensing terms. In yet another example, the second script can unwrap and then rewrap the content encryption key with the accessing application 155 credentials. In yet another example, the second script can set information in a protected area and the first script only runs if the protected area is populated with that information. In yet another example the second script can modify or set some data with information related to the accessing application and device. The first script will verify the data values or check for the existence of this data in order to successfully gain access to the content 165 or application. The data may be located in the content file itself, or stored elsewhere in the non-volatile storage device 160. For a "per seat" license, the data could be modified with information related to the host ID. For a "per IMSI" license the data could be modified with information related to the IMSI of user using accessing application. In yet another example, a modified copy of the data could be added.

Figure 4:
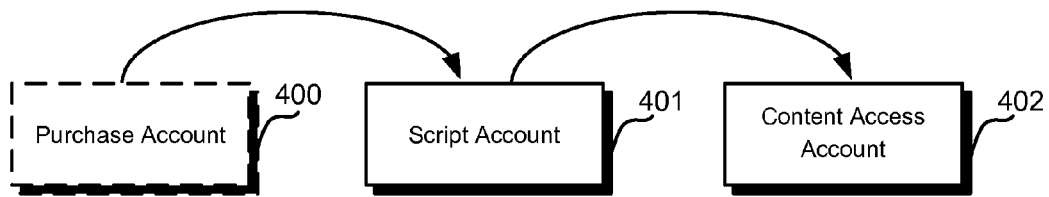
FIG. 4 is a diagram illustrating exemplary accounts in an access control system used to control access to content.

In some embodiments the content (or access to the rights) is protected with an access control system that uses accounts. In that case the licensing terms could be tied to dedicated account and the account credentials ties into a given configuration of the accessing device 150. The licensing terms are enforced by requiring a successful login to the related account. For example a "per seat" license could have multiple accounts each related to different accessing devices. The device account could be related to the IMEI or some other device ID. Thus each accessing device would have a different account on the card. A "per seat" license would be enforced by only providing access to the authorized accessing device(s). FIG. 4 illustrates this embodiment where the second script could create an content access account 402 used to access the content, the account being created according to the licensing terms and the accessing device 150 or application 155. Access to the content from the script account 401 is then transferred to the content access account 402. In some embodiments transferring access involves moving a permission and preventing the second script from executing successfully again.

In another example, an account with access to the content is updated so that the first script may execute successfully, as explained further below. In yet another example the account is used for a set of files, resulting in binding the entire set at once. In yet another example an account is created so that the first script can execute successfully.

In some other embodiments the script account 401 is renamed into the content access account 402 therefore binding at once all content associated with the script account 401.

Figure 5A:
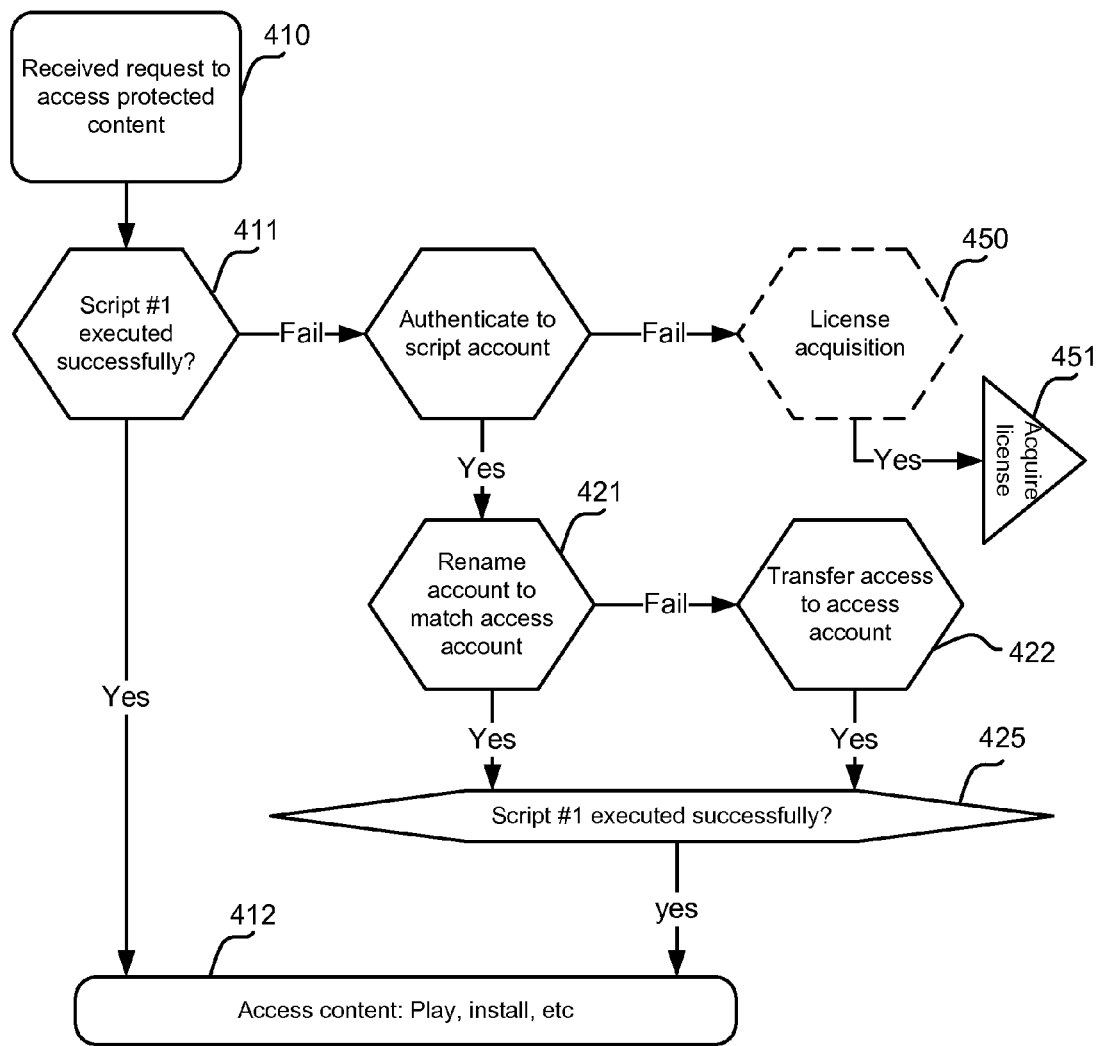
FIG. 5A is a diagram illustrating steps for binding content at first use with an access control system with accounts.
Figure 5B:
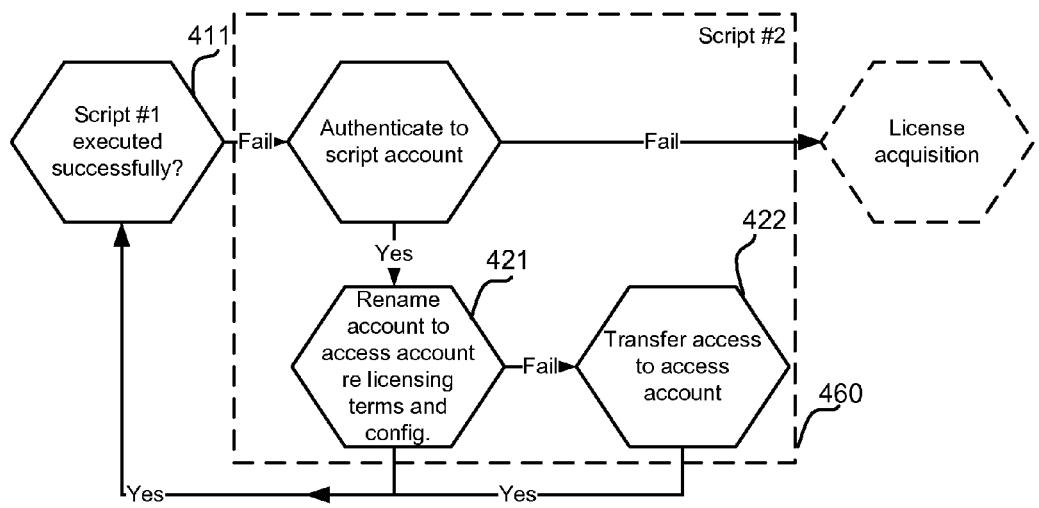
FIG. 5B is a diagram illustrating steps for binding content at first use with an access control system with accounts.
Figure 5C:
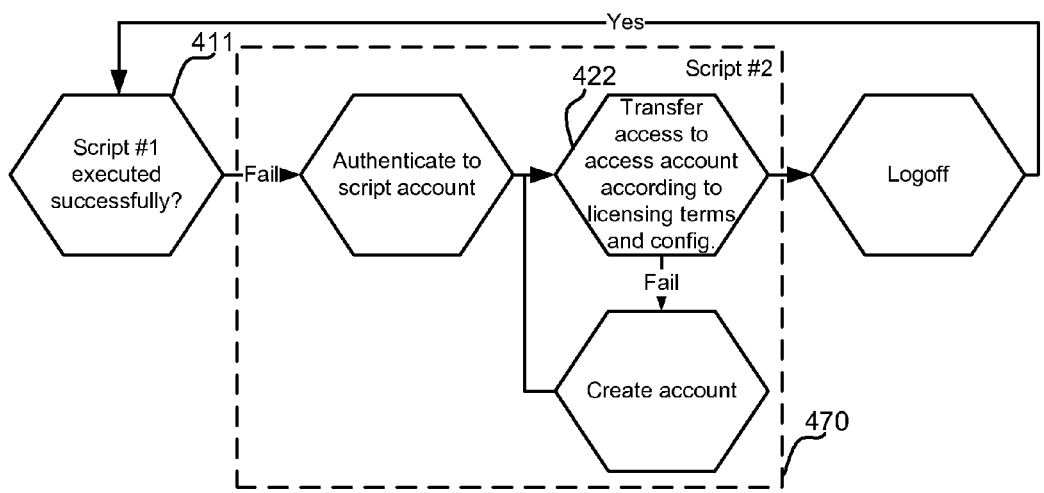
FIG. 5C is a diagram illustrating steps for binding content at first use with an access control system with accounts.
Figure 5D:
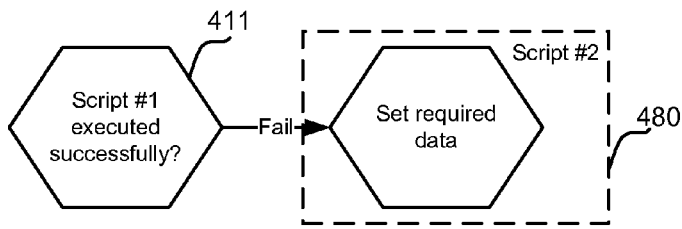
FIG. 5D is a diagram illustrating steps for binding content at first use with an access control system with accounts.

Some embodiments address the case where additional content could have been added after the binding occurred. These embodiments could combine both renaming the account and moving a permission. FIG. 5A is a diagram illustrating steps for binding content at first use with an access control system with accounts. A content or application access request is received at step 410. In response, the accessing application 155 attempts to access the content by executing the first script. The success of this attempt is tested at step 411. If the licensing terms are met for the accessing application and the accessing device information, then the attempt will succeed, and control passes to step 412 where the content is accessed. If the licensing terms are not met for the accessing application and the accessing device information, then the attempt will fail, and control passes to step 421. At step 421, if the script account 401 cannot be renamed because the content access account 402 related to the licensing terms and accessing device or application already exists, then at step 422 the access permission is transferred from the script account 401 to the existing and related content access account 402. FIGS. 5B, 5C, and 5D also illustrating steps for binding content at first use with an access control system with accounts. These figures also highlight exemplary steps 460, 470, 480 contained in a second script or content binding script executable by the accessing device 150. By executing one set of these exemplary steps 460, 470, 480, the accessing device 150 may set the binding to the content and allow the first script or content access script to successfully access the content.

Figure 6:
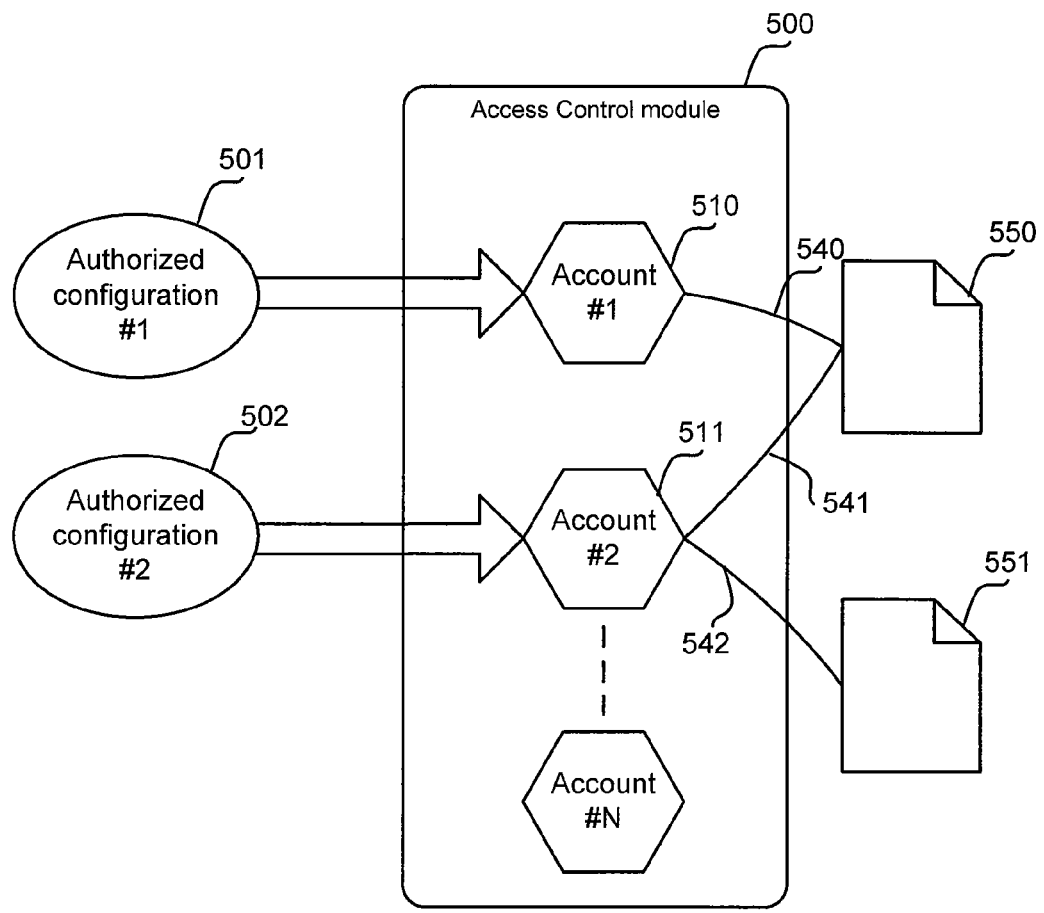
FIG. 6 is a diagram illustrating different configurations using different accounts to access content.

FIG. 6 illustrates an exemplary embodiment where the content can be accessed by using more than one account. For example the access control module 500 that controls access to the content has two accounts 510 and 511 with permission 540, 541 to access the content (or set of content) 550. Account 511 also has permission 542 to access content (or set of content) 551. Account 510 may have been configured to be used by authorized configuration 501 and account 511 may have been configured for use by authorized configuration 502. An authorized configuration relates to the licensing terms and the related information from the accessing device 150 and application 155. For example for a "per seat" license, the account could relate to the accessing device 150 identifier. In this example, an accessing application 155 on that accessing device 150 could use a credential related to the accessing device 150 identifier when trying to gain access to the content using the account associated with the configuration. Accessing the same content from another device may fail, because another device may present different credentials that may be rejected by the account, or because another device may be assigned to another account that may not have permission to access the content. In some embodiments the presented credentials could be the same but the account assigned to each configuration could differ. In some embodiments the account credentials also relate to the licensing terms. For example for a "per IMSI" license, the account name or credentials could be derived from the IMSI value.

In some embodiments the second script, when executed successfully creates credentials to use with the first script. For example, the second script can certify the key pair of the accessing application (or create a certified key pair) using a certification authority valid to access the content. Using Public Key Infrastructure (PKI) may permit sharing a single account for multiple configurations while providing a method to recover from a breach.

In an alternative embodiment of the second script, the licensing terms could limit the number of entities concurrently accessing the content. For example, while multiple accounts can have access to the same piece of content, the access control system could enforce a licensing term that each account could only be used by one entity at a time. The number of accounts, therefore, determines how many entities can concurrently access the content. In this embodiment, the second script could be used to find an account available to access the content. The script could define a sequence to find the next available account that may access the content. In another embodiment the second script might combine with additional functions to authorize access to the content by more than one configuration. For example, the second script could check and update a counter each time it is executed. The counter could be as simple as storing data in an area protected against unauthorized modification or access. Successful execution would depend in part on checking the current value with the authorized target set with the licensing terms. In this way, the second script could be executed more than once, but less than an infinite number of times, thus allowing the content to be bound to more than one configuration. In one embodiment, the second script could also check for additional criteria such as time and date, a combination of counter and time and date, etc.

In some embodiments the second script may have a self-disabling feature, where the second script may disable itself by design and in some other cases the second script must perform an action to disable itself. The following section gives some examples of how the second script could disable itself. These examples are provided to illustrate the methods and should not be taken in any way as limiting the functionality of the second script. These embodiments are independent from the methods used to perform the content binding and can be combined with such in any way.

In some embodiments, the second script might move or delete data and thus the data would not be found and the second script would not execute successfully the next time it is executed. Alternatively, the second script would only execute successfully if such information does not yet exist.

In some embodiments, the second script might transfer its permission to access the content and thus lose its ability to transfer it again, and thus the second script would not execute successfully an additional time.

In some embodiments, the second script cannot be executed because the accessing application 155 cannot access the second script anymore. For example, the second script is protected and the information required to access the script is not longer available. In another example, the accessing application 155 credentials are no longer valid to read the second script. In another example, the script account 401 used by the application does not have access to the second script anymore.

In some embodiments, the second script might delete itself after being executed successfully, thus preventing its re-execution.

In some embodiments the second script might delete its permissions to access the content or its permissions to provide access to the content. Once the permissions are deleted, the second script is no longer capable of authorizing access.

In some embodiments the second script might transfer its access to certificate authority credentials to another account, or may delete its access to the certificate authority credentials. By doing so, the script will not be able to certify credentials to authorize access to a configuration to a piece of content with licensing terms.

The second script may also have a re-enabling (or re-authorizing) feature. Specifically, the previous embodiments describe binding the content at first use through execution of a second script. Once bound, some of these embodiments allow the content to be used, or in the case of an application, to be installed without limitation as long as the licensing terms are met. However, there might be a need to bind the content to additional configurations or to "credit back" the binding, such as when an application is uninstalled from an authorized configuration. Stated another way, there might be some benefit to enable the second script for additional binding operations by renewing or re-authorizing its successful execution.

While the following describes some embodiments to enable the second script to re-execute successfully, it is important to keep in mind that some content providers may not authorize this process or may not authorize this process for specific content pieces or content types. As such, re-authorizing successful execution of the second script should be considered optional.

A typical example would be a need to access the content using another configuration. In case of a "per seat" license, it would mean another accessing device 150. Typical examples would be another accessing device 150, such as accessing content using a personal computer and a cellular telephone, or another user, such as when two different users of the same accessing device require access to the content.

In another example, there might also be a need to roll back to previous state, thereby unbind the content. For example, a user with a single "per seat" license may wish to uninstall an application on a first personal computer, and install an application on a second personal computer. This process may involve unbinding the content from the first device or configuration, and re-binding the content to the second device or configuration.

Another example may involve unbinding content. In a case of content bound to the SIM card, the user could unbind the content from information associated with the SIM card such as the IMSI value. Re-authorizing successful execution of the second script may have an impact on the licensing and therefore could require some security. In some embodiments, re-authorizing the second script may involve a server, such as establishing a connection with a server and receiving an authorization from the server.

In other embodiments, the application performing that function is an authorized application.

In some cases re-authorizing successful execution of the second script may involve a payment system. In another embodiment, the accessing device 150 may connect with a payment system as part of the purchase and re-authorization process. Referring briefly to FIG. 3, the conceptual format of the content file may include optional fallback information 407 that may contain instructions such as a purchase script, addresses, tags, or other data to allow the completion of the purchase and re-authorization process. For example, in one embodiment, the fallback information 407 may contain the address of a server where credentials may be purchased.

The following embodiments provide some examples of re-authorizing the second script to provide access to another configuration. In some embodiments, this process is usually related to the method used to disable the second script. Once re-authorized, the second script can be successfully executed again to bind the content to a new configuration and permit access to the content using the first script. The re-authorization process may involve receiving information that was moved or deleted during prior execution of the second script or it may involve setting information needed to execute the second script. In some embodiments, this information could be set or delivered after a payment has taken place.

In some embodiments re-authorization of the second script involves putting back some information needed for the second script to successfully execute.

In some embodiments re-authorization of the second script involves providing the second script with the permission to provide access to the content to another configuration. For example a script account used by the second script is provided access to the content and the second script transfers that access permission to a content access account when executed successfully.

In some embodiments re-authorization of the second script means that the second script can once again access the certificate authority credentials. For example some needed certificate authority credentials are made available again to the second script.

In some cases some credentials to access the content are provided for use by the second script. For example this could be an activation code received after the payment process has taken place.

As mentioned, the second script may be re-enabled, for example, through unbinding and credit back. The following embodiments provide some examples where the second script is re-authorized once an authorized configuration is no longer authorized (e.g. after uninstall or unbind).

In some embodiments re-authorization of the second script could mean deleting or moving back information related to an authorized configuration, such as moving a file.

In some embodiments re-authorization of the second script could mean removing an authorized configuration.

In some embodiments re-authorization of the second script could mean updating a certificate revocation list to suspend the certificate of the configuration no longer needed. In one embodiment, this may also include re-gaining access to the certificate authority credentials.

In some embodiments re-authorization of the second script could mean updating an account used by an authorized configuration to become usable by the second script. The following section describes an exemplary embodiment of a system utilizing Trusted Flash. In this embodiment, multiple pieces of content are distributed on a storage device. Some of the content comes with a "per network" license and is already set for a given network. Some content comes with a "per SIM" license and should be set at first access. Some content comes with a "per seat" license. For example the network operator has exclusive content that is bound to the network; some movies are set with "per SIM" and finally some games are set with "per seat". The network bound content would be available for access for any subscriber of the network operator. The content bound to the SIM would be available for access on any devices where the SIM of an authorized configuration is inserted. Finally, the content with a "per seat" license would be available for use or install on any authorized devices. It could permit unlimited use or install unless the content comes with DRM or some other expiration.

Figure 7:
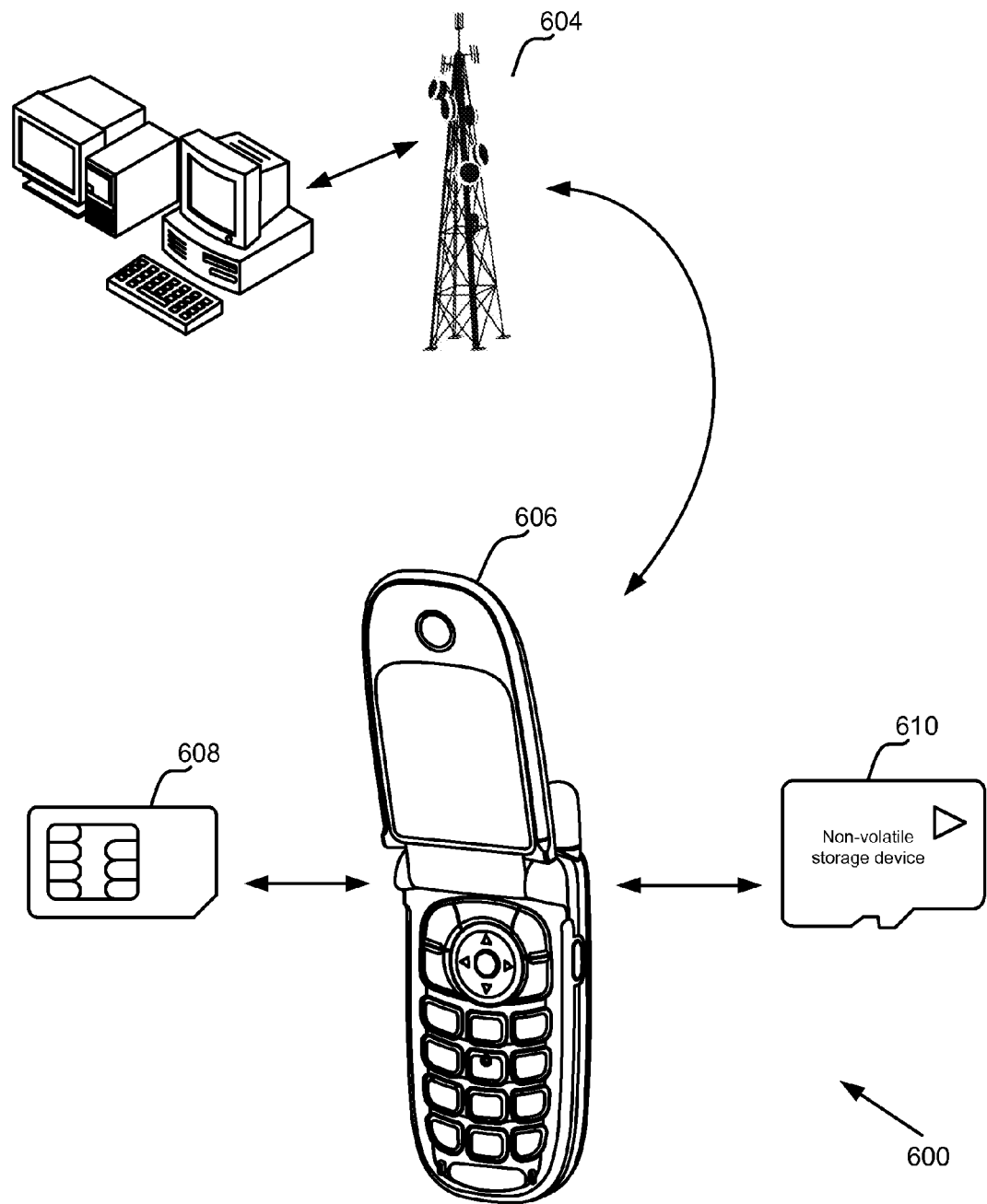
FIG. 7 is a diagram illustrating an exemplary system for controlling access to content on a non-volatile storage device.

FIG. 7 shows a system 600 where the accessing device 606 is a mobile handset. Accessing device 606 has a SIM card 608 from mobile operator 604. Mobile device 606 can access content on storage device 610.

Figure 8:
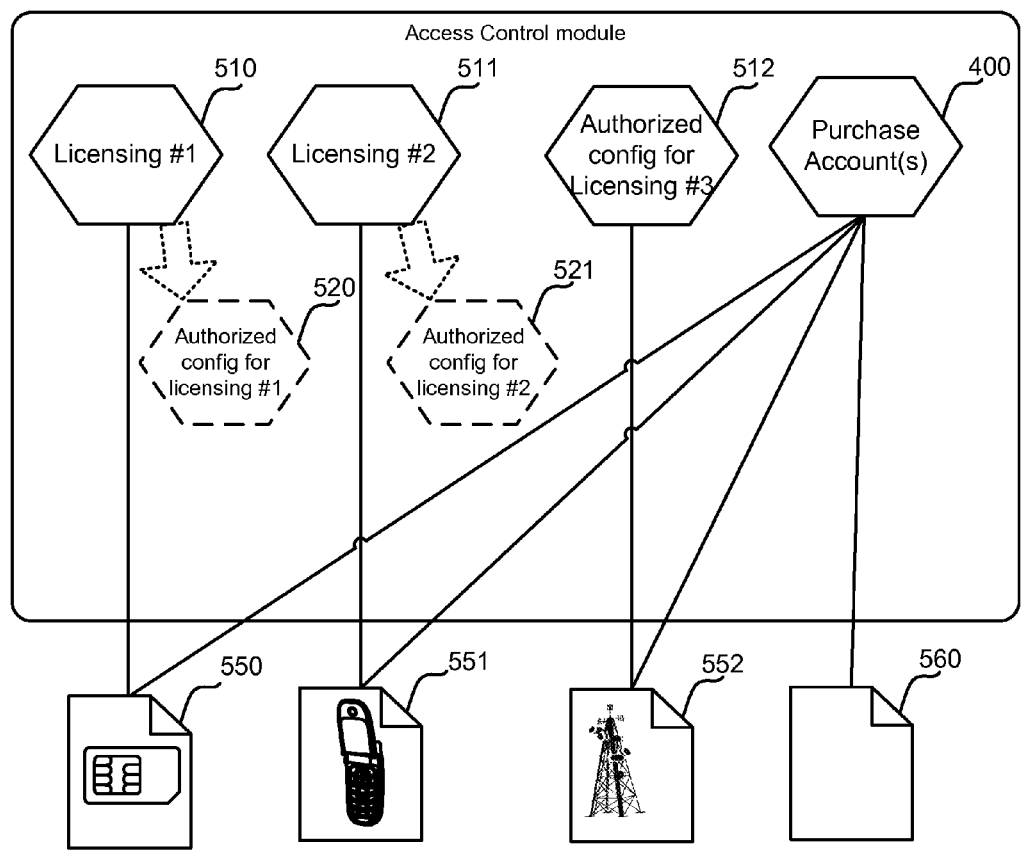
FIG. 8 is a diagram illustrating the configuration of an access control system used when distributing content with different licensing terms.
Figure 8:
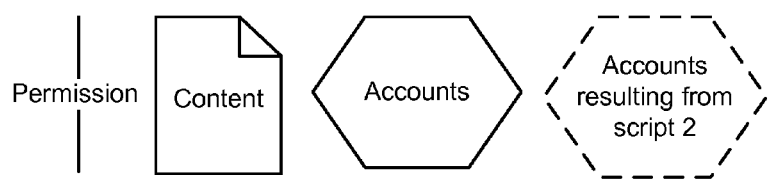

FIG. 8 shows an exemplary embodiment of an access control system configured for content distributed with the above licensing terms. In some embodiments the access control module runs on the storage device 610.

The exemplary embodiment is aimed to illustrate one example of a configuration, and not to limit the possible configurations. The access control system supports multiple accounts. An account could be authorized for more than one piece of content. Some accounts may not have access to content. FIG. 8 shows the accounts created for distribution. The accounts 510, 511 and 512 are related to the licensing terms. The second script may use these different accounts depending on the content and its licensing terms. For example, the second script may use account 510 for content 550 that is licensed under "per SIM" licensing terms; and would use account 511 for content 551 that is licensed under "per seat". Content 552 is already set for network binding for the corresponding network operator and the first script may use account 512 for access. Content 550, 551, 552, or 560 could be a single piece of content or a set of content.

FIG. 8 also shows the accounts resulting from a successful execution of the second script. For example, account 520 is used by an authorized configuration to access content 550. Because content 550 is set with licensing terms "per SIM", the credentials of account 520 are related to the SIM authorized when the second script executes successfully. Similarly account 521 results from a successful execution of the second script related to content 551 that is set with licensing terms "per seat." Additional accounts not shown in FIG. 8 might be created by additional successful executions of a second script.

In the example the content is configured with a header 404 that contains information regarding: the licensing terms, the access control method for the first script and the binding process for the second script. The header contains a reference name to the content encryption key and information for the first script. The header also contains information for the second script that is a tag that is ciphered with a key controlled by the storage device and ciphered a second time with the reference name of the content cipher key. The tag indicates what type of account to use for access (according to the licensing) and how to set the binding.

The first time the content is accessed, the tag is used to identify what method to use to access the content (first script) but the content cannot be accessed and the first script cannot execute successfully. Then the accessing application tries to execute the second script associated with the tag. The second script is then executed and if the conditions meet the licensing terms then the second script enables access to the content using the first script. After the second script has successfully executed, it could disable itself when the account used by the script no longer has access to the content. The account 510 could be updated to become account 520 usable by the first script to access the content and therefore binding the set of content 550 at once. Alternatively the permission from account 510 could be transferred to account 520 (for example when account 520 already exists) and therefore binding the piece of content 550.

Access to the content by configurations can be added using one or more purchase accounts 400. The purchase account 400 that has access to the content is used to provide access to the content to the account 400 used by the second script that is related to the licensing terms. The second script can be re-authorized when the permission from the purchase account is shared with the account used by the second script for the given piece of content. If the account no longer exists (e.g. when renamed), it could be re-created. In one embodiment, the re-authorization process includes completing a purchase and re-enabling the second script.

In some embodiments some accounts may have access only to a single piece of content. This type of approach allows delivering the credentials after a purchase with limited risk: the credentials work only for a single piece of content.

Unbinding or uninstalling process can be done using the purchase account 400 that has access to the given piece of content. The process would re-authorize the second script by providing access to the content to the account related to the licensing terms and used by second script.

Figure 9:
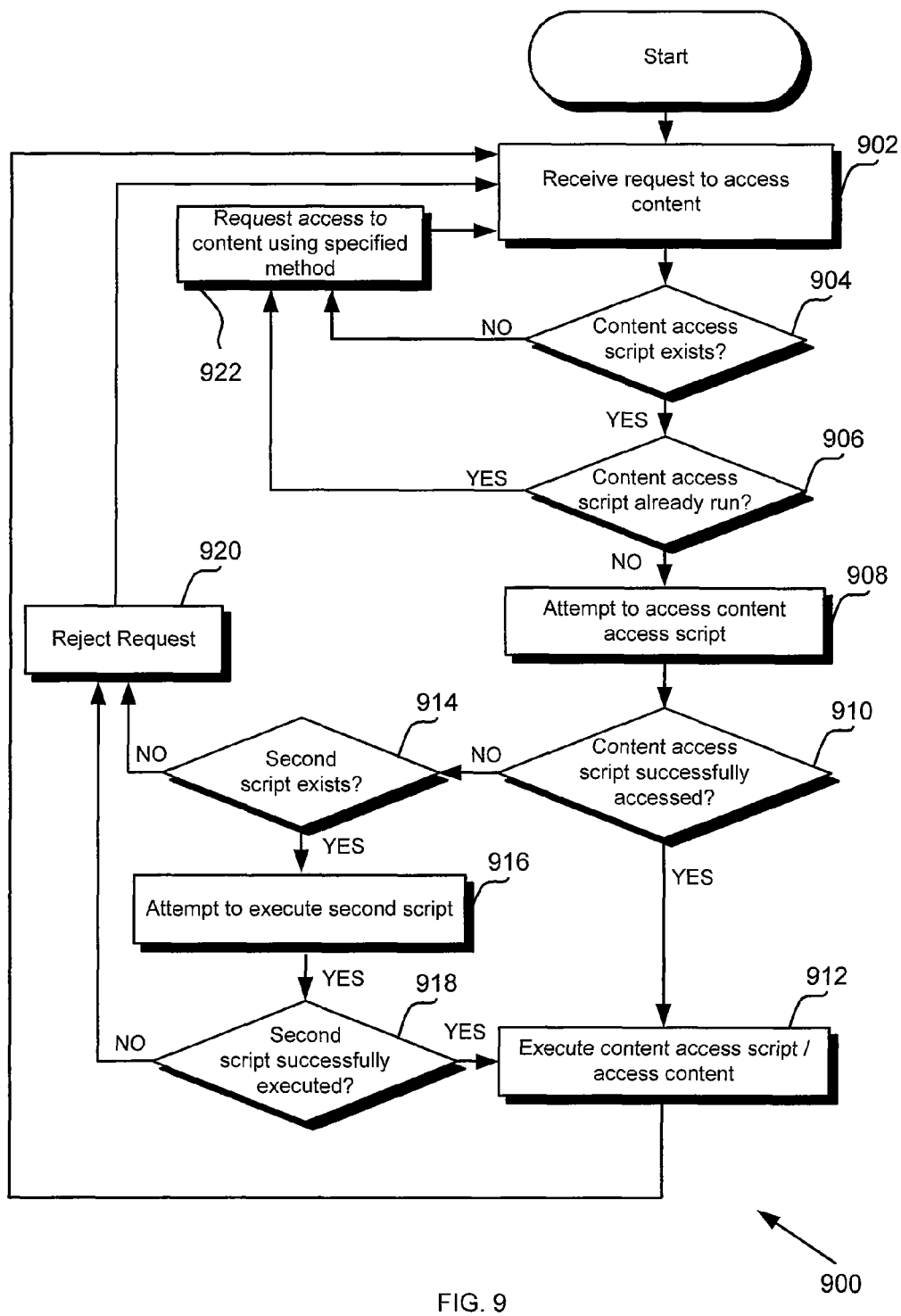
FIG. 9 shows exemplary steps for accessing content stored in the non-volatile storage device of FIG. 7.

To illustrate additional aspects, FIG. 9 is a diagram of exemplary steps 900 for accessing content stored in the non-volatile storage device FIG. 7. Control begins at step 902, where a request is received at the accessing device 606 to access the protected content. The request may originate from the user of the accessing device 606, from a device in communication with the accessing device 606, or from an application or other executable code, hardware or software module within the accessing device 606 itself, such as an accessing application 155. Control passes to step 904, where a test determines if a content access script is associated with the content. If not, control passes to step 922, where access to the content is requested using the specified method, such as a content access method 404 associated with the content, or a method specified in the request received in step 902. If a content access script is associated with the content, control passes from step 904 to step 906, where a test determines if the content access script has already been successfully executed. If so, control passes to step 922, where the content is accessed by executing the content access script, which is the specified content access method 404. If the content access script has not already been executed, then control passes from step 906 to step 908, where the accessing device 606 attempts to access the content access script. Step 910 tests if this attempt to access the content access script is successful. If the attempt to access the content access script is successful, control passes to step 912, where the content access script is executed, and the content is accessed. Control then passes to step 902 to wait for another access request.

The attempt to access the content by accessing and executing the content access script may fail for any number of reasons. The content access script may not be accessible, for example, if the accessing device 606 does not have a permission to read the script, or access to a decryption key in order to decrypt the script before execution. In another embodiment, the content access script may fail to execute because necessary information is missing. If the content access script is not accessible or fails to execute, control passes from step 910 to step 914, where a test determines if a second script exists. As stated above, the second script may contain or be associated with instructions that enable the accessing device 606 to successfully execute the content access script. If the second script does not exist, the request is rejected at step 920, and control then passes to step 902 to wait for another access request. If the second script exists, the accessing device 606 attempts to execute the second script at step 916.

As stated before, successful execution of the second script is not guaranteed. For example, if the second script has already been executed once by this or another accessing device 606, then the second script may be disabled from executing again. Similarly, the second script may be disabled after executing a finite number of times. A test at step 918 determines if the second script was successfully executed by the host 706. If not, then the second script was unable to enable the accessing device 606 to access the content using the content access script, and thus bind the content in accordance with the license term. In this case, control passes to step 920, where the content access request is rejected, and then back to step 902, where a new request can be received and processed. If the second script was successfully executed by the accessing device 606, then the accessing device 606 may now execute the content access script. Control passes from step 918 to step 912, where the content access script is executed, and the content is accessed. Control then passes back to step 902 to process additional requests.

Figure 10:
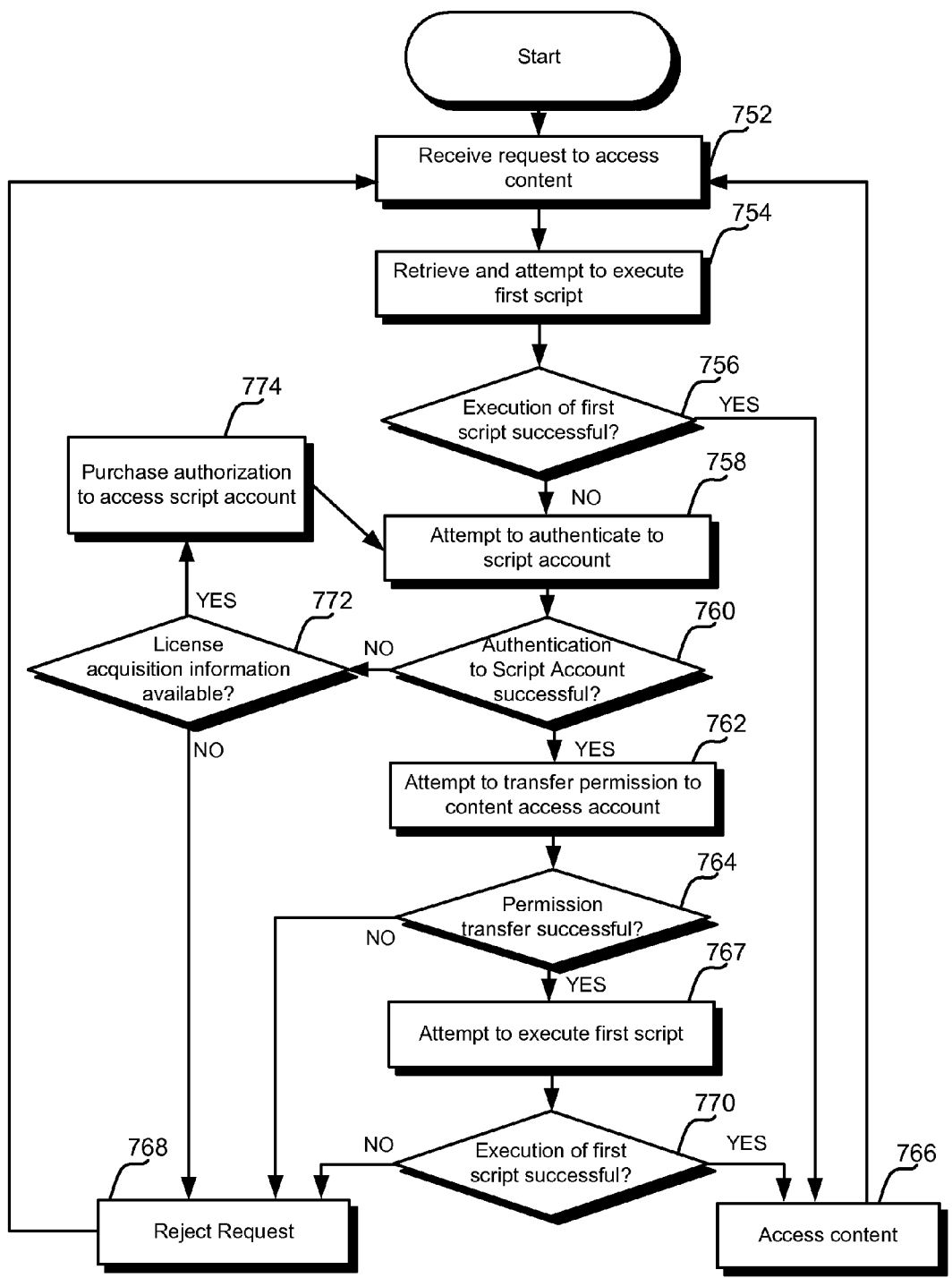
FIG. 10 shows exemplary steps for accessing content stored in accordance with the accounts of FIG. 4.

FIG. 10 shows exemplary steps for accessing content stored in accordance with the accounts of FIG. 4. Control begins at step 752, where a request to access content is received at the accessing device 150. The request may originate from the user of the accessing device 150, from a device in communication with the accessing device 150, or from an application or other executable code, hardware or software module within the accessing device 150 itself, such as an accessing application 155. Control passes to step 754, where the accessing application 155 attempts to retrieve the first script from the non-volatile storage device 160, and execute the first script in order to access the content. In one embodiment, accessing the first script requires authenticating to the content access account 402, then reading the script in accordance with a permission or authorization provided by the content access account 402. At step 756, a test determines whether this attempt was successful. For example, the attempt may fail because the configuration lacks permission to retrieve the first script or access data or information required to successfully execute the first script, such as a permission associated with the content access account 606. In another example, the first script is not associated with a requisite permission to perform the requested access. If the attempt succeeded, control passes to step 766, where the content is accessed, and then back to step 752 in order to wait for another request.

If the attempt in step 754 fails, control passes to step 758, where the accessing device attempts to authenticate to the script account. Authentication, also referred to as a "log in" to the account, may entail providing a password, completing a challenge-response sequence, or performing other steps in order to verify the identity of the entity seeking authentication, as detailed further below. At step 760, a test determines if the authentication attempt is successful. For example, the authentication attempt may fail because the script account 401 does not exist, or because the accessing device or configuration did not provide the correct password or credential in order to be authenticated.

If the attempt fails, control passes to step 772, where a test determines if a license may be acquired to obtain access to the script account 401. In one embodiment, the test determines whether the accessing device 150 or configuration may contact a remote server in order to purchase a license. If license acquisition information is available, control passes from step 772 to step 774, where an authorization is purchased to access the script account 401. In one embodiment, the purchase transaction may include the creation of a script account 401 if one does not exist. Control then returns to step 758 to attempt again to authenticate to the script account. If the acquisition information is not available, then control passes from step 772 to step 768, where the access request is rejected, and then to step 752 to wait for another access request.

Returning to step 760, if the authentication to the script account is successful, then control passes to step 762, where an attempt is made to transfer a permission to access the first script to the content access account 606. A test in step 764 determines whether the attempt is successful. If the attempt to transfer a permission to access the first script to the content access account 606 is not successful, then control passes to step 768, where the request is rejected, then back to step 752 to wait for another request. If the attempt to transfer a permission to access the first script to the content access account is successful control passes from step 764 to step 767, where another attempt is made to execute the first script in order to access the content. In one embodiment, accessing the first script requires authenticating to the content access account 606, then reading the script in accordance with a permission or authorization provided by the content access account 606. Control passes to step 770, where another test determines if execution of the first script is successful. If the first script successfully executed, then control passes to step 766, where the content is accessed, and returns to step 752 to wait for another request. If the first script not successfully executed, then control passes to step 768, where the request is rejected, and returns to step 752 to wait for another request.

Steps 762 and 764 show the transfer of a permission between the script account 401 and a content access account 606. In another embodiment, step 762 includes an attempt to rename a script account 401, thereby converting it to a content access account 606. In this embodiment, step 764 then tests if the renaming attempt is successful. As previously discussed, renaming a script account 401 allows the binding of one or more pieces of content associated with the account. In one embodiment, steps 762 and step 764 may be performed by executing instructions in a second script 408.

Figure 11:
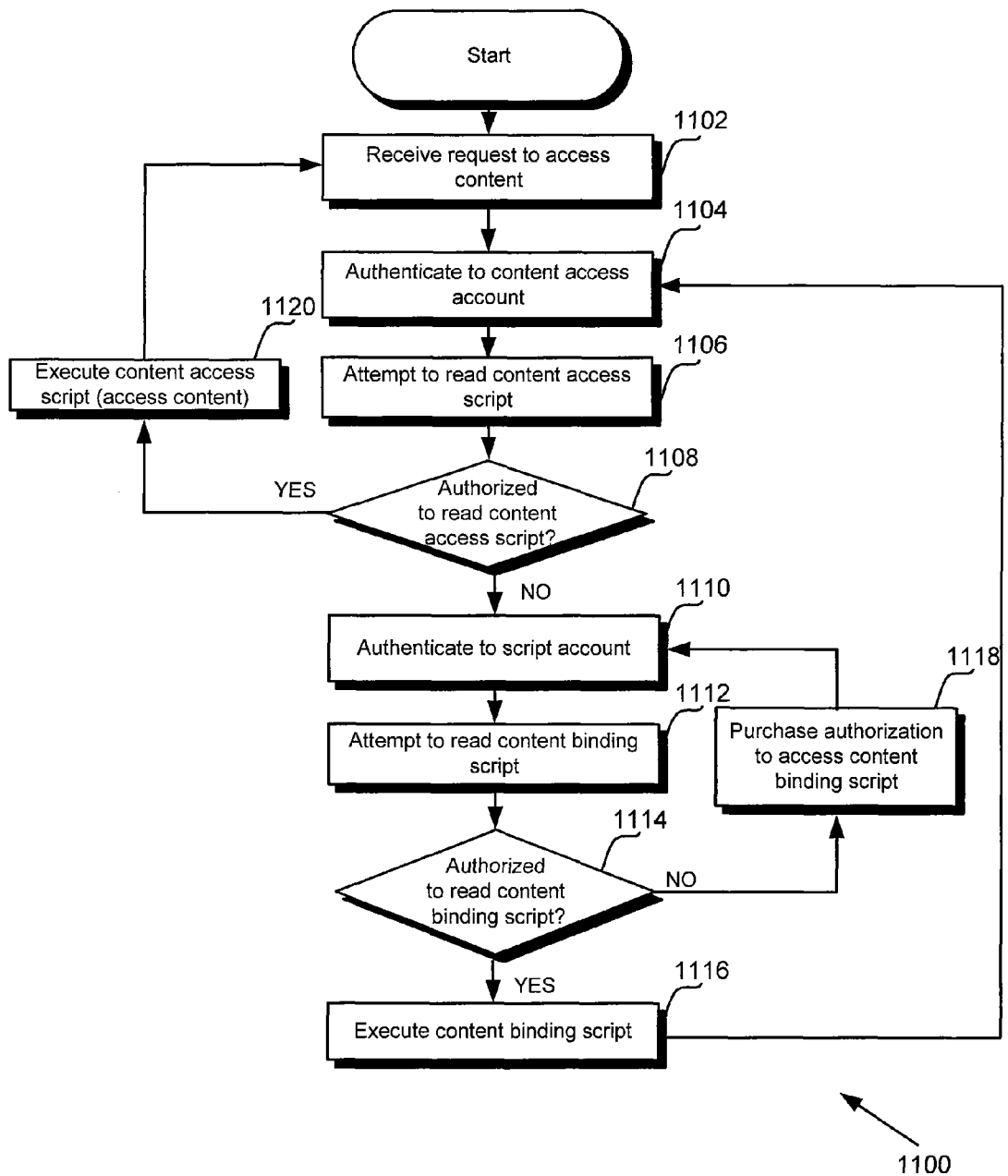
FIG. 11 shows exemplary steps for accessing and binding content stored in a non-volatile storage device to an account.

FIG. 11 shows exemplary steps 1100 for accessing and binding content stored in a non-volatile storage device to an account. Control begins at step 1102, where a request is received to access content 165 stored in the non-volatile storage device 610. The request may originate from the user of the accessing device 606, from a device in communication with the accessing device 606, or from an application or other executable code, hardware or software module within the accessing device 606 itself, such as an accessing application 155. Control passes to step 1104, where the accessing device 606 authenticates itself to the non-volatile storage device content access account 402 associated with the accessing device 606. Once authenticated to the content access account 402, the accessing device 606 has access to one or more permissions, and may have access to a permission that allows reading, decryption, or execution of the content access script. As previously discussed, the content access script may be protected by limiting access to the partition or memory locations that store the script, or by protecting the script itself through encrypting its contents. In step 1106, the accessing device 606 attempts to read the content access script 404. Control passes to step 1108, where the success of this read attempt is evaluated. If the non-volatile storage device allows the accessing device 606 to read the unencrypted script, or permits the accessing device 606 to decrypt the content access script 404 using a key associated with the content access account, then control passes to step 1120, where the content access script is executed. The executed instructions in the content access script allow the accessing device 606 to access the content. Control then returns to step 1102 to wait for another content access request.

The steps 1102, 1104, 1106, 1108, 1120 form a repeatable sequence for accessing content already bound to a particular configuration. However, if the content is not yet bound to a particular configuration, then the content access account will not contain the requisite permission to access (and thus execute) the content access script. In this case, control passes from step 1108 to step 1110, where the accessing device 606 authenticates to the script account 401. Once authenticated to the script account 401, the accessing device 606 has access to one or more permissions, and may have access to a permission that allows reading, decryption, or execution of the content access script. In step 1112, the accessing device 606 attempts to access the content binding script. In one embodiment, the content binding script is at least a portion of the content access script 404. The attempt to access the content binding script will succeed if the accessing device 606 is authorized to do so. In one embodiment, this authorization is a permission to access to content binding script. The permission to access the content binding script may be a permission to access a partition or location where the content binding script is stored in the non-volatile storage device, or a permission to access a decryption key in order to decrypt the content binding script before execution.

In step 1114, if the accessing device 606 is authorized to access the content binding script, then control passes to step 1116, where the content binding script is executed. Execution of the content binding script transfers or delegates the permission to access the content access script from the script account to the content access account. Control then passes back to step 1104 to complete the access to the content by accessing the content access script through the content access account, and executing the content access script. If the accessing device 606 is not authorized to access the content binding script, then the content may already be bound to another accessing device 606. In this case, the request may be rejected, or, in one embodiment shown in FIG. 9, control may pass to step 1118, where the accessing device 606 may purchase an authorization to access the content binding script in order to bind the content to the accessing device 606. Once purchased, control passes back to step 1110 in order to access the content binding script using the purchased authorization or permission, and execute the script in order to bind the content to the accessing device 606.

Figure 12:
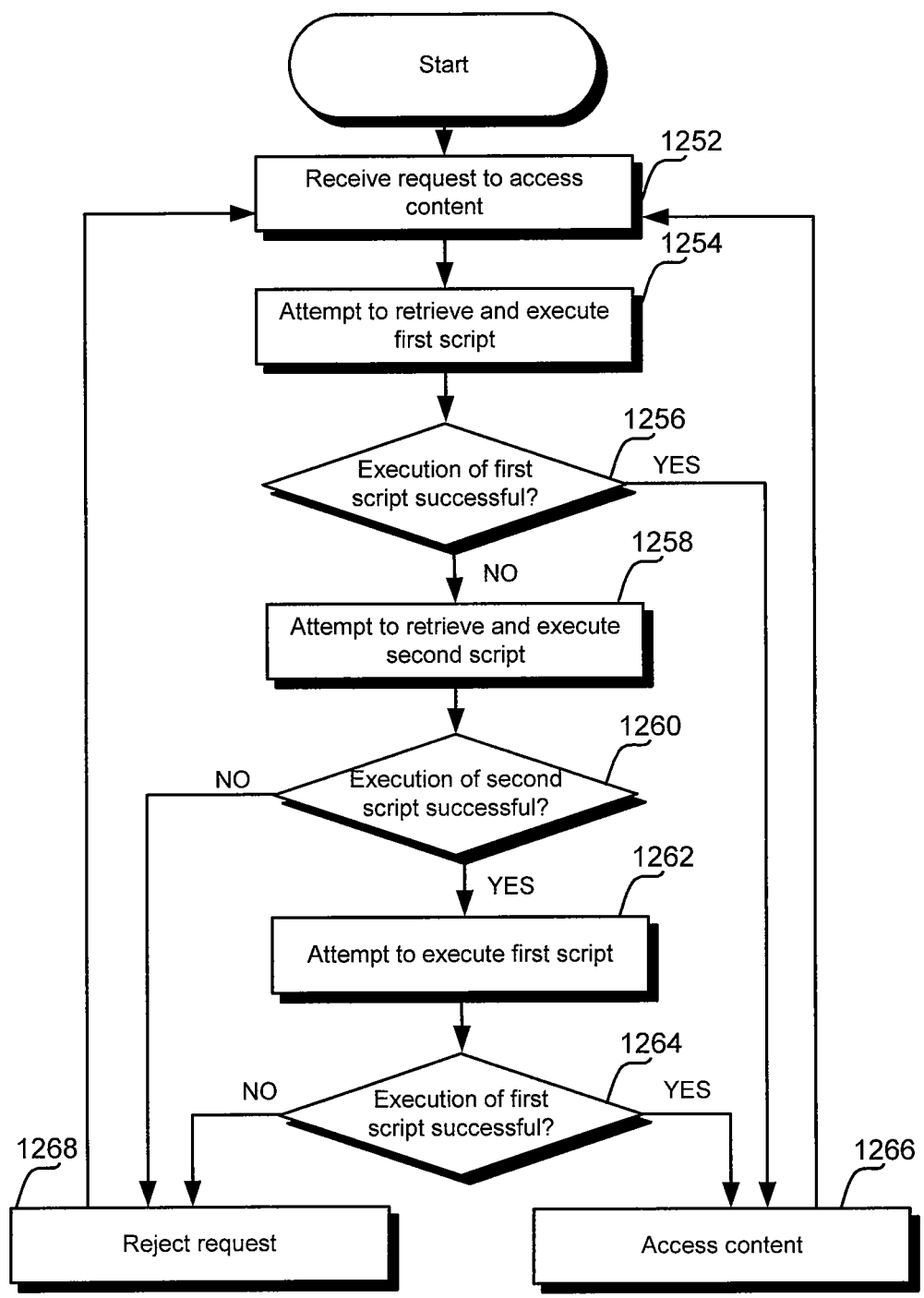
FIG. 12 is a diagram illustrating exemplary steps for binding content.

FIG. 12 is a diagram illustrating exemplary steps for controlling access to content on a non-volatile storage device in accordance with an embodiment. Control begins at step 1252, where a request to access content is received at the accessing device 150. The request may originate from the user of the accessing device 150, from a device in communication with the accessing device 150, or from an application or other executable code, hardware or software module within the accessing device 150 itself. Control passes to step 1254, where the accessing device device 150 attempts to retrieve the first script from the non-volatile storage device 160, and execute the first script in order to access the content. At step 1256, a test determines whether this attempt was successful. For example, the attempt may fail because the configuration lacks permission to retrieve the first script or access data or information required to successfully execute the first script. In another example, the first script is not associated with a requisite permission to perform the requested access. If the attempt succeeded, control passes to step 1266, where the content is accessed, and then back to step 1252 in order to wait for another request.

If the attempt fails, control passes to step 1258, where the accessing device device attempts to retrieve the second script from the non-volatile storage device 160, and attempts to execute the second script in order to enable access the content using the first script. At step 1260, a test determines whether this attempt in step 1258 was successful. For example, the attempt may fail because the second script was already executed and disabled itself. If the attempt fails, control passes to step 1268, where the access request is rejected, then back to step 1252 to wait for another request. If the request succeeds, control passes to step 1262, where a second attempt is made to execute the first script. At step 1264, a test determines whether the attempt in step 1262 succeeded. If the attempt succeeded, control passes to step 1266, where the content is accessed, and then back to step 1252 in order to wait for another request. If the attempt failed, control passes to step 1268, where the access request is rejected, then back to step 1252 to wait for another request.

In one embodiment, the second script may contain instructions to disable itself from being executed again. Thus, if the second script is successfully executed in step 1258, future attempts to execute the script may fail. Thus, the content is bound to the first accessing device or configuration to successfully execute the second script.

Although the invention has been described with respect to various system and method embodiments, it will be understood that the invention is entitled to protection within the full scope of the appended claims.

What is claimed is:

1. A method of accessing content stored in a non-volatile storage device, the method comprising:
   in an accessing device coupled with the non-volatile storage device, the non-volatile storage device comprising a removable non-volatile storage device, the accessing device having a processor and an accessing application executable by the processor, wherein the non-volatile storage device has (i) content, (ii) a content access script associated with the content and including primary instructions to access the content, and (iii) a second script associated with the content and including second instructions to access the content, with the processor of the accessing device, performing:
   receiving a request to access the content stored in the non-volatile storage device;
   reading the content access script from the non-volatile storage device;
   attempting to execute the content access script;
   if the content access script successfully executes, accessing the content with the content access script; and
   if the content access script fails to execute:
      reading the second script from the non-volatile storage device; and
      executing the second script, wherein the second script, when executed, permits the processor to set a binding and access the content using the content access script, and results in binding the content to a configuration of the accessing application, without communicating with a remote authorization entity, wherein the remote authorization entity is located remotely from the accessing device.

2. The method of claim 1, wherein the configuration of the accessing application comprises a value indicative of an identity of a network in communication with the processor.

3. The method of claim 1, wherein the configuration of the accessing application comprises a value indicative of an identity of a user of the processor.

4. The method of claim 1, wherein the configuration of the accessing application comprises an identification value of an accessing device comprising the processor.

5. The method of claim 1, wherein the configuration of the accessing application comprises a value indicative of an identity of a Subscriber Identity Module card in communication with the processor.

6. The method of claim 1, wherein the content comprises a file, and wherein the content is associated with a set of files stored in the non-volatile storage device.

7. The method of claim 1, wherein binding the content to the configuration of the accessing application comprises binding a set of files to the configuration of the accessing application.

8. The method of claim 1, wherein the second script, when executed, prevents an ability to re-execute successfully the second script.

9. The method of claim 8, wherein the second script prevents the ability to re-execute successfully the second script by moving or deleting data required for successful re-execution of the second script.

10. The method of claim 8, further comprising restoring the ability to re-execute successfully the second script after preventing the ability to re-execute.

11. The method of claim 10, wherein the content comprises an application, wherein the second script, when executed, installs the application, and wherein the restoring the ability to re-execute successfully the second script comprises uninstalling the application.

12. The method of claim 10, wherein the restoring the ability to re-execute successfully the second script comprises:
    establishing a connection with a server;
    receiving an authorization from the server; and
    providing the authorization to the non-volatile storage device.

13. The method of claim 1, wherein the second script, when executed, updates a binding count value in the non-volatile storage device indicative of a number of times the second script has been executed, wherein executing the second script prevents an ability to re-execute the second script if the binding count value is equal to a predetermined value.

14. The method of claim 1, wherein the second script comprises a protected script.

15. The method of claim 1, wherein the request to access the content comprises a request to access the content using a content access account in the non-volatile storage device, wherein the content access account is not associated with a content binding account permission; and
    wherein the second script comprises a content binding script that, when executed, associates the permission with the content access account and prevents an ability to re-execute successfully the content binding script.

16. The method of claim 15, further comprising:
    after executing the content binding script, reading the content access script from the non-volatile storage device; and
    executing the content access script, wherein the content access script, when executed, accesses the content in accordance with the request if the accessing application is authenticated to the content access account and authorized to access the content according to the permission.

17. The method of claim 16, wherein the accessing application comprises a configuration associated with the content access account.

18. The method of claim 17, wherein the configuration associated with the content access account comprises a value indicative of an identity of a network in communication with the processor.

19. The method of claim 17, wherein the configuration of the accessing application comprises a value indicative of an identity of a user of the processor.

20. The method of claim 17, wherein the configuration of the accessing application comprises an identification value of the accessing device comprising the processor.

21. The method of claim 17, wherein the configuration of the accessing application comprises a value indicative of an identity of a Subscriber Identity Module card in communication with the processor.

22. The method of claim 15, wherein the permission comprises access to a content encryption key, and wherein the content stored on the non-volatile storage device comprises content encrypted with the content encryption key.

23. The method of claim 15, wherein the content comprises an application, the permission comprises an execute permission, and the request comprises a request to execute the application.

24. The method of claim 15, wherein the reading the second script from the non-volatile storage device comprises:
    authenticating to a content binding account in the non-volatile storage device; and
    if authorized by a content binding script permission associated with the content binding account, reading the content binding script from the non-volatile storage device using the content binding account.

25. The method of claim 24, wherein the executing the second script comprises removing an association between the content binding script permission and the content binding account.

26. The method of claim 24, wherein the content binding script permission comprises a content binding script encryption key.

27. The method of claim 26, wherein the content binding script comprises instructions encrypted with the content binding script encryption key.

28. The method of claim 15, further comprising restoring the ability to re-execute the content binding script after preventing the ability to re-execute successfully the content binding script.

29. The method of claim 15, wherein the content binding script, when executed, updates a binding count value in the non-volatile storage device indicative of a number of times the content binding script has been executed,
    wherein executing the content binding script prevents the ability to re-execute the content binding script if the binding count value is equal to a predetermined value.

30. The method of claim 29, further comprising restoring the ability to re-execute the content binding script after preventing the ability to successfully re-execute the content binding script.

31. An accessing device for accessing content stored in a non-volatile storage device, the accessing device comprising:
    a processor;
    a content accessing application executable by the processor; and
    wherein the processor is configured to, when the accessing device is coupled with the non-volatile storage device:
        receive a request to access the content stored in the non-volatile storage device;

read from the non-volatile storage device a content access script associated with the content, the content access script including primary instructions to access the content;

attempt to execute the content access script;

if the content access script successfully executes, access the content with the content access script;

if the content access script fails to execute:
- read a second script from the non-volatile storage device, the second script associated with the content and including second instructions to set a binding and provide access to the content; and
- execute the second script, wherein the second script, when executed, sets the binding and permits the processor to access the content using the content access script and results in binding the content to a configuration of the accessing application, without communicating with a remote authorization entity, wherein the remote authorization entity is located remotely from the accessing device; and wherein the non-volatile storage device comprises a removable non-volatile storage device.

32. The accessing device of claim 31, wherein the accessing device comprises a mobile telephone.

33. The accessing device of claim 32, wherein the configuration of the accessing application comprises a value indicative of an identity of a network in communication with the processor.

34. The accessing device of claim 33, wherein the configuration of the accessing application comprises a value indicative of an identity of a user of the processor.

35. The accessing device of claim 32, wherein the configuration of the accessing application comprises an identification value associated with the processor of the accessing device.

36. The accessing device of claim 32, wherein the configuration of the accessing application comprises a value indicative of an identity of a Subscriber Identity Module card in communication with the processor.

* * * * *